US008392258B2

(12) United States Patent
Kurihara

(10) Patent No.: US 8,392,258 B2
(45) Date of Patent: Mar. 5, 2013

(54) RECEIPT MANAGEMENT SYSTEM

(75) Inventor: Jun Kurihara, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 266 days.

(21) Appl. No.: 12/754,791

(22) Filed: Apr. 6, 2010

(65) Prior Publication Data
US 2010/0274685 A1 Oct. 28, 2010

(30) Foreign Application Priority Data

Apr. 28, 2009 (JP) ................. 2009-109584

(51) Int. Cl.
G06Q 20/00 (2012.01)
G07B 17/00 (2006.01)
G07F 19/00 (2006.01)
(52) U.S. Cl. ............................. 705/16; 705/30; 707/769
(58) Field of Classification Search .................... 705/16, 705/30
See application file for complete search history.

(56) References Cited

U.S. PATENT DOCUMENTS

| 6,842,115 B1* | 1/2005 | Harris et al. .............. 340/572.1 |
| 7,797,192 B2* | 9/2010 | Mitchell et al. ................. 705/16 |
| 8,296,229 B1* | 10/2012 | Yellin et al. ...................... 705/39 |
| 2003/0055733 A1* | 3/2003 | Marshall et al. ................ 705/24 |
| 2003/0088487 A1* | 5/2003 | Cheng et al. .................... 705/30 |
| 2003/0233279 A1 | 12/2003 | Shinzaki |
| 2004/0083134 A1* | 4/2004 | Spero et al. ..................... 705/16 |
| 2004/0225567 A1* | 11/2004 | Mitchell et al. ................. 705/16 |
| 2005/0125296 A1* | 6/2005 | Tidwell et al. .................. 705/16 |
| 2007/0164106 A1* | 7/2007 | McDevitt et al. ............. 235/383 |
| 2008/0285814 A1* | 11/2008 | Di Carlo et al. ............. 382/115 |

FOREIGN PATENT DOCUMENTS

| JP | 08-153279 | 6/1996 |
| JP | 2002-297855 | 10/2002 |
| JP | 2004-287714 | 10/2004 |
| JP | 2006-202202 | 8/2006 |
| JP | 2006-227748 | 8/2006 |
| JP | 2007-528034 | 10/2007 |
| WO | WO 02/50789 A1 | 6/2002 |

OTHER PUBLICATIONS

ValiCert and arcot team to offer complete visa authenticated payment solution. (Nov. 7, 2001). PR Newswire. Retrieved from http://search.proquest.com/docview/447074586?accountid=14753.*
Japanese office action issued in corresponding Japanese App. No. 2009-109584, mailed Nov. 6, 2012.

* cited by examiner

Primary Examiner — Scott Zare
(74) Attorney, Agent, or Firm — Greer, Burns & Crain, Ltd.

(57) ABSTRACT

A receipt management system receives receipt data including biometric data which is issued when a product is purchased at a store, and judges whether or not biometric data that coincides with an employee's biometric data is registered in an employee management table of a company.

3 Claims, 5 Drawing Sheets

REGISTERED COMPANY MANAGEMENT TABLE

| COMPANY ID | COMPANY NAME | IP ADDRESS |
|---|---|---|
| 001 | AAA CORPORATION | 1 1 1. 2 2 2. 3 3 3. 0 0 1 |
| 002 | BBB CORPORATION | 1 1 1. 2 2 2. 3 3 3. 0 0 2 |
| 003 | CCC CORPORATION | 1 1 1. 2 2 2. 3 3 3. 0 0 3 |
| 004 | DDD CORPORATION | 1 1 1. 2 2 2. 3 3 3. 0 0 4 |
| 005 | EEE CORPORATION | 1 1 1. 2 2 2. 3 3 3. 0 0 5 |
| : | : | : |

F I G. 2

COMPANY LIST TABLE

| COMPANY ID | COMPANY NAME |
|---|---|
| 001 | AAA CORPORATION |
| 002 | BBB CORPORATION |
| 003 | CCC CORPORATION |
| 004 | DDD CORPORATION |
| 005 | EEE CORPORATION |
| : | : |

F I G. 3

EMPLOYEE MANAGEMENT TABLE

| EMPLOYEE ID | NAME | BIOMETRIC DATA |
|---|---|---|
| 00000001 | ICHIRO FUJITSU | ※※※※※※※※ |
| 00000002 | JIRO FUJITSU | ※※※※※※※※ |
| 00000003 | SABURO FUJITSU | ※※※※※※※※ |
| 00000004 | SHIRO FUJITSU | ※※※※※※※※ |
| 00000005 | GORO FUJITSU | ※※※※※※※※ |
| : | : | : |

FIG. 5

RECEIPT MANAGEMENT SYSTEM

CROSS-REFERENCE TO RELATED APPLICATION

This application is based upon and claims the benefit of priority of prior Japanese Patent Application No. 2009-109584, filed on Apr. 28, 2009, the entire contents of which are incorporated herein by reference.

FIELD

The present invention relates to a receipt management system using biometrics authentication.

BACKGROUND

Receipts, which are issued as certifications of a purchasing transaction, are still paper based, and this causes problems with loss and falsification.

Today, in most cases, a receipt is issued by printing it using a POS register or by handwriting it. Both of these ways are paper based. The purchaser then takes the receipt to her/his company and is reimbursed.

In regard to the flow such as is described above, the following matters (1 to 4) can be raised as problems.
1. In regard to a paper receipt, the amount of money can be rewritten or it can be issued without the amount of money being written on it. Therefore, it is very easy for the receipt to be falsified.
2. Since a purchaser manages a paper receipt, it can be lost. There is no way to identify the owner of a receipt. Therefore, someone else can disguisedly receive money if the receipt is stolen.
3. Reimbursing processes (entering of the amount of money and the like) are performed by hand. Therefore, when there are many receipts, for the task of entering the information for the reimbursing processes is troublesome, complex, and inefficient.
4. Since paper and ink are used, resources are consumed. This is not preferable in terms of environmental protection.

As a related art, patent document 1 indicates an information management system configured with a register set up in a store, a portable terminal of a user (product purchaser), and an information storage device. In this system, when the user goes out and purchases a product, the register generates and transmits the receipt information of the product to the portable terminal of the user. When the portable terminal receives the receipt information, it adds additional information including a personal ID and the like to the receipt information and transmits it to the information storage device.

Patent document 2 indicates a system that stores and processes receipt data. In this system, after an employee purchases and pays for a product at a store, an agent system creates receipt data including a company code, an employee code, and a receipt number, and transmits it to the network. In addition, at the store, a receipt record on which the receipt data is printed is given to the employee. The transmitted data is stored in a memory in a company system by way of several systems, and then expense reimbursing processes are performed on the company side.

However, the technology of patent document 1 has a problem in which a third party who knows additional information, such as a personal ID, can disguisedly and illicitly receive money.

The technology of patent document 2 has a problem in which a third party who has obtained a receipt record can disguisedly and illicitly receive money.

Patent Document 1:
Japanese Laid-open Patent Publication No. 2002-297855
Patent Document 2:
Japanese Laid-open Patent Publication No. 2004-287714

SUMMARY

The present invention is made in view of the problems above. The object of the present invention is to provide a receipt management system for preventing a third party from disguisedly receiving money.

The proposed receipt management system comprises a business system set up in a store, an intermediation server set up in a management company, and a receipt processing system set up in a member company.

The business system comprises: a receipt data creation unit for creating receipt data in accordance with the purchasing of a product at the store; a biometric data reading unit for reading biometric data of a product purchaser; a company selection unit for having the product purchaser select a company to which the product purchaser belongs from a company list; and a transmission unit for combining a company ID corresponding to the company selected by the product purchaser, the created receipt data, and the read biometric data as one datum, and for transmitting the one datum to the intermediation server as receipt data including biometric data.

The intermediation server comprises: a destination determination unit for searching a registered company management table having company IDs and IP addresses by using as a key the company ID contained in the receipt data including biometric data when the receipt data including biometric data is received from the business system, and for determining that an IP address corresponding to a found company ID is a destination of the received receipt data including biometric data; and a transfer processing unit for transferring the received receipt data including biometric data to the determined destination.

The receipt processing system comprises an employee identification processing unit for searching an employee management table having employee IDs and biometric data by using as a key the biometric data contained in the receipt data including biometric data when the receipt data including biometric data is received from the intermediation server, and for judging, in accordance with a result of the search, whether or not biometric data that coincides with the biometric data used as a key is registered in the employee management table.

In the proposed receipt management system, the transmission unit combines a company ID corresponding to a company selected by a product purchaser, created receipt data, and read biometric data as one datum, and transmits the one datum to the intermediation server as receipt data including biometric data.

In other words, when a product is purchased, the biometric data of a purchaser is associated with receipt data. Generally, the purchaser does not carry the receipt data including biometric data with her/him. Therefore, a third party cannot disguisedly receive money.

BRIEF DESCRIPTION OF DRAWINGS

FIG. 2 is a diagram showing a registered company management table.

FIG. 3 is a diagram showing a company list table.

FIG. 5 is a diagram showing an employee management table.

DESCRIPTION OF EMBODIMENT

Now, on the basis of the drawings, the embodiments of the present invention will be described in detail.

Figure 1:
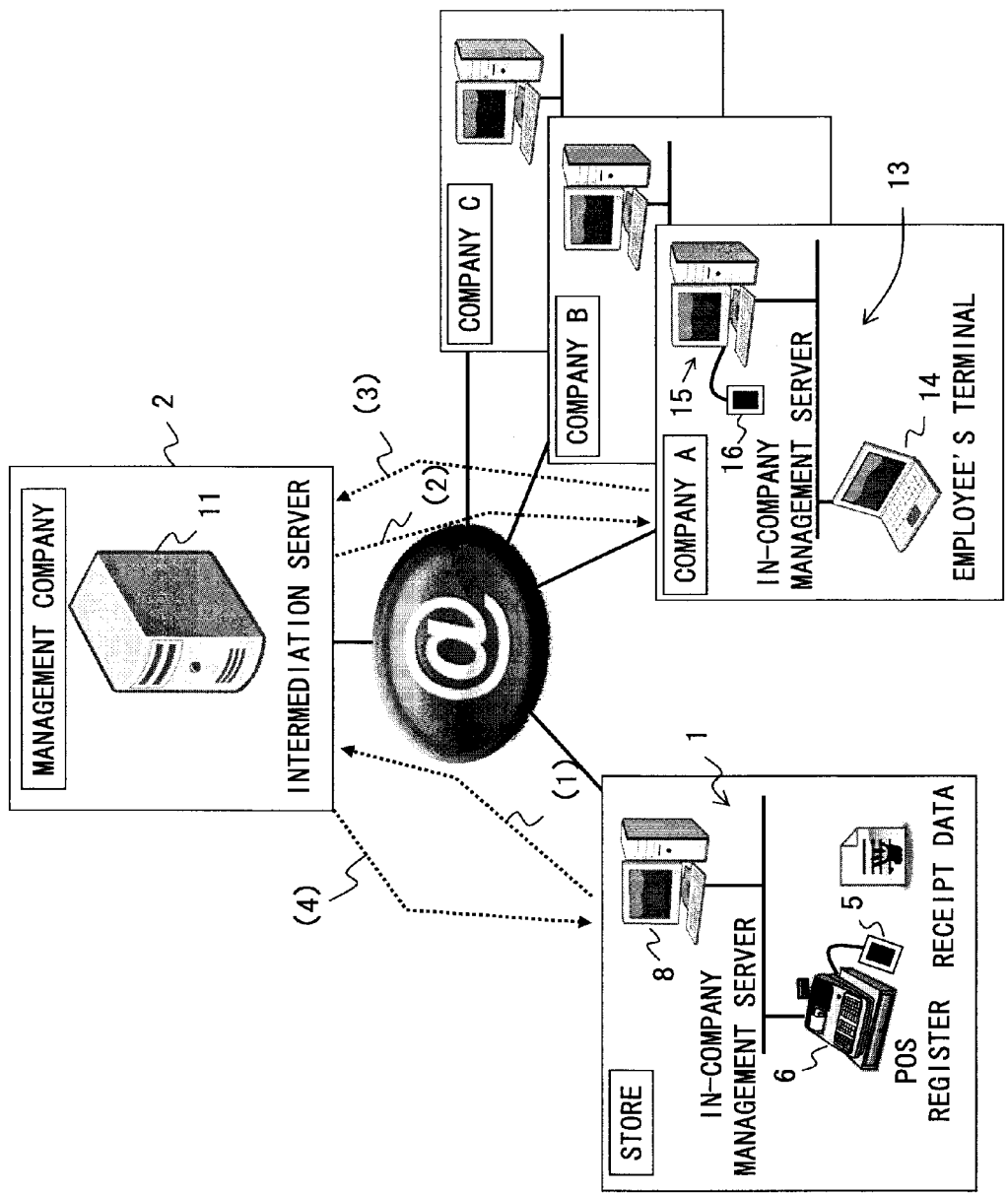
FIG. 1 is a block diagram showing a configuration of a receipt management system according to one embodiment of the present invention.

FIG. 1 is a block diagram showing a configuration of a receipt management system according to one embodiment of the present invention.

As shown in FIG. 1, this system comprises: a business system 1 set up in a store; companies registered as members (here, companies A, B and C); and a management company 2 for managing the data of a receipt issued when an employee of each of the member companies purchases a product at the store, and the like.

The business system 1 comprises a POS register 6 connected via a cable to a biometric data reading unit 5, and an in-store management server 8 connected via a network to the POS register 6.

As will be described later, the in-store management server 8 has a function that combines a company ID corresponding to a company name selected through the screen of the POS register 6 by an employee (worker), receipt data created in accordance with the employee's purchasing of a product at the store, and biometric data read by the biometric data reading unit 5 as one datum and that transmits the one datum to an intermediation server 11 as receipt data including biometric data.

The management company 2 has the intermediation server 11 that receives the receipt data including biometric data from the store and that transmits (transfers) the data to a corresponding company.

Each company has a receipt processing system. This receipt processing system is common to the companies. Here, company A will be described as an example.

A receipt processing system 13 of company A comprises an employee's terminal 14 and an in-company management server 15 connected through a network to the terminal 14. A biometric data reading unit 16, used when registering biometric data (palm veins, for example) of each of the employees, is connected through a cable to the in-company management server 15.

A company using the service of the system previously registers its name and IP address in the intermediation server 11 of the management company 2. The intermediation server 11 assigns a company ID to each company. As a result, a registered company management table that has company IDs, company names, and IP addresses, such as is shown in FIG. 2, is generated.

The intermediation server 11 extracts company IDs and company names from the registered company management table in FIG. 2 so as to transmit them as a company list table, such as is shown in FIG. 3, to an in-store management server of each store. In terms of security, it is dangerous to hold an IP address of each of the companies in the in-store management server of each of the stores. Therefore, the intermediation server 11 manages all the IP addresses of the companies without transmitting them to the in-store management server of each of the stores.

Now, with reference to the flow in FIG. 4, the operation of the receipt management system of the present embodiment will be described.

An employee (worker) belonging to any of the registered companies purchases and pays for a product at a store. On this occasion, in step S1, the POS register 6 creates receipt data in accordance with the purchasing of the product. In addition, the employee holds her/his palm over the biometric data reading unit 5 connected to the POS register 6, such that her/his palm vein is read as biometric data.

The screen of the POS register 6 displays the company names in the company list table shown in FIG. 3. The employee selects a company to which she/he belongs from the displayed table.

The company ID corresponding to the company name selected by the employee, the created receipt data, and the read biometric data are combined as one datum (hereinafter referred to as "receipt data including biometric data"), and the one datum is transmitted through (1) in FIG. 4 (or FIG. 1) to the intermediation server 11. For example, the combination above can be achieved by respectively changing the data above into individual files in such a way that they are stored in one folder. If necessary, encryption processing may be performed.

Figure 4:
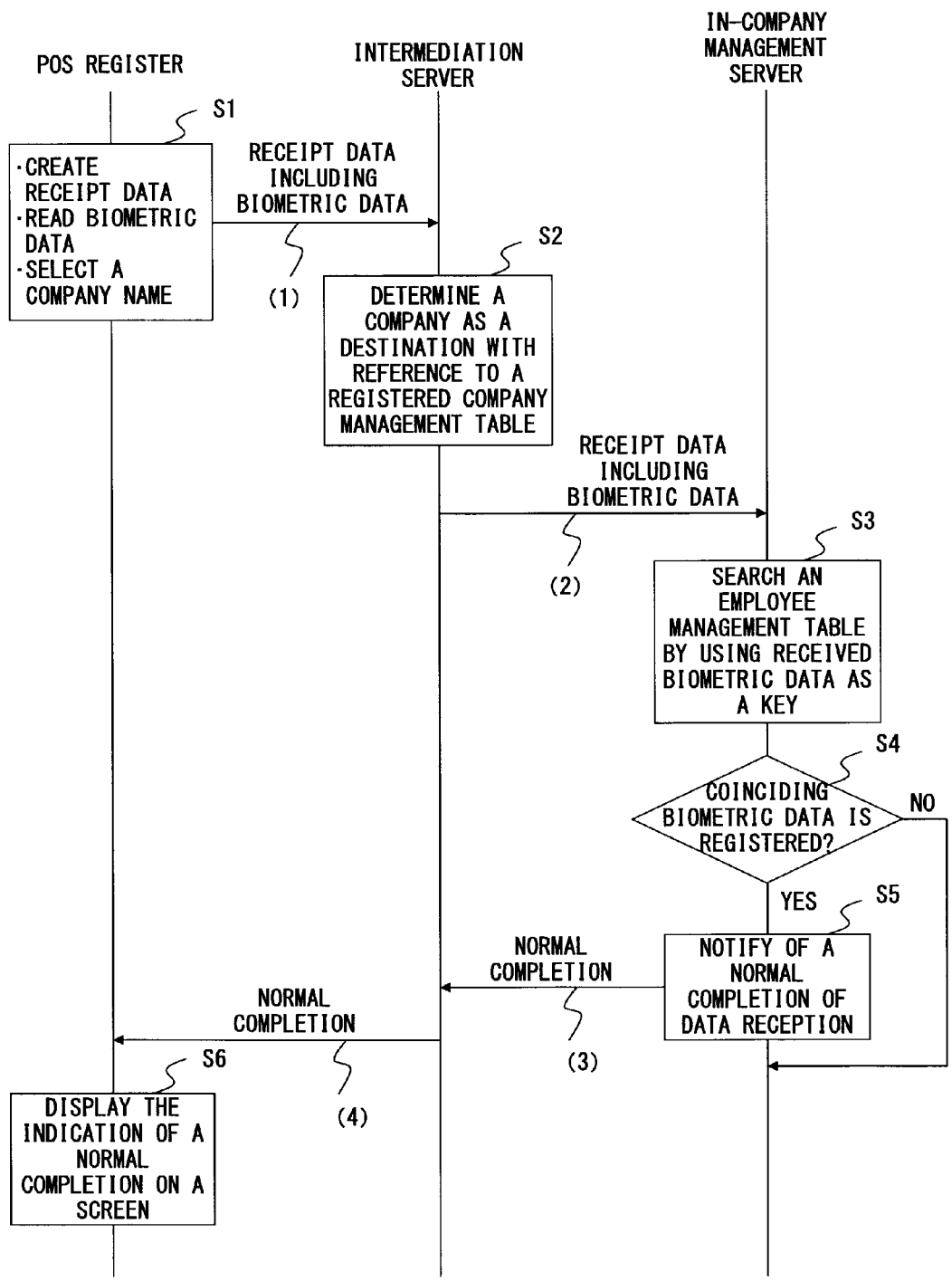
FIG. 4 is a diagram showing a system flow.

In step S2, after the intermediation server 11 receives the receipt data including biometric data from the POS register 6, it searches the registered company management table shown in FIG. 2 by using as a key the company ID contained in the received receipt data including biometric data, determines that an IP address corresponding to the found company ID is the destination of the received receipt data including biometric data, and transfers the received receipt data including biometric data through (2) in FIG. 4 (or FIG. 1) to the destination.

In step S3, using as a key the biometric data contained in the received receipt data including biometric data, the in-company management server of the corresponding company which receives the receipt data including biometric data from the intermediation server 11 searches an employee management table, such as is shown in FIG. 5, that has the employee IDs, names, and biometric data.

Then, in step S4, as a result of the search above, it is judged whether or not biometric data that coincides with the biometric data used as a key is registered in the employee management table in FIG. 5.

When it is judged in step S4 that biometric data that coincides with the biometric data used as a key is registered (i.e., when the judgment result in step S4 is YES), the in-company management server of the corresponding company notifies, in step S5, the intermediation server 11 of the fact that reception of the data (receipt data including biometric data) has been normally completed (i.e., the fact that the employee has been identified). In other words, the in-company management server sends a normal completion notice through (3) in FIG. 4 (or FIG. 1) to the intermediation server 11.

After the intermediate server 11 receives the normal completion notice, it transfers the notice through (4) in FIG. 4 (or FIG. 1) to the POS register 6 that is a source of the receipt data including biometric data.

After the POS register 6 receives the normal completion notice, it conveys a normal completion on a screen and terminates a processing series in step S6.

Meanwhile, when it is judged in step S4 that biometric data that coincides with the biometric data used as a key is not registered (i.e., when the judgment result in step S4 is NO), a processing series is terminated.

When the POS register 6 does not receive a response for a certain period of time after transmitting receipt data including biometric data, it will retransmit the receipt data including biometric data and steps S2 to S4 above will be repeated. If the reception of a normal completion notice is not completed even when the timing of attempts is regulated and an employee cannot be identified, then the receipt data from the POS register 6 may be saved in a UBS memory which the employee has with her/him. Alternatively, an e-mail to which the receipt data is attached may be transmitted from the POS register 6 to the employee's cellular phone so as to save the data in it. Here, since it cannot be checked on the spot whether or not the receipt data has been received if it is transmitted to a terminal, such as a personal computer at the employee's home, a terminal at her/his office, or the like, the receipt data may be transmitted to the employee's cellular phone.

When the reception of data (receipt data including biometric data) is normally completed and employee identification is completed, reimbursing processes will be of course performed later.

The following is a description of reimbursing processes.

The format of a receipt is not particularly limited, but is essentially image data. The amount of money, application, and the like are extracted from the image data, and the reimbursing processes are performed. Each company may have different procedures for reimbursing processes.

For example, in a company that adopts electronic office procedures, a request is automatically made for an executive to give an approval. In a company that does not adopt electronic office procedures, an e-mail to which the image data is attached is transmitted to an employee's terminal, and the data is printed on a paper medium from the terminal.

When receipt data is recorded in the USB memory above or a memory in a cellular phone, the employee transmits the receipt data from the employee's terminal at her/his office to an in-company management server and performs identification and reimbursing processes.

In the descriptions above, employee identification is performed by verifying biometric data contained in receipt data including biometric data against the biometric data of all employees registered in the employee management table in FIG. 5 (i.e., 1-to-N verification is performed). However, if a performance of this is not enough to make such a configuration and loads to a device need to be reduced, then the purchaser of a product may also enter her/his employee ID when biometric data is read by the POS register 6. Then, the receipt data including biometric data which further includes the employee ID may be transmitted to an intermediation server.

In this case, a receipt processing system of a corresponding company which receives, through the intermediation server, the receipt data including biometric data which includes the employee ID comprises an employee identification processing unit (not shown) for searching an employee management table having employee IDs and biometric data by using as a key the employee ID contained in the received receipt data including biometric data, and for judging, in accordance with a result of the search, whether or not biometric data related to the employee ID used as a key is registered in the employee management table when an employee ID that coincides with the employee ID used as a key is searched for.

Then, if the biometric data related to the employee ID used as a key is registered in the employee management table, it is determined that data reception has been normally completed.

In such a configuration, since 1-to-1 verification is performed, the time required for verification processing can be reduced. A particular employee ID entered is not regulated. All that is needed to be done is simply to have a product purchaser enter the employee ID of a company that she/he belongs to. Regardless of the format of the employee ID, the business system 1 set up in a store may incorporate an entered employee ID in receipt data including biometric data and may transmit it.

What is claimed is:

1. A receipt management system including a business system set up in a store, an intermediation server set up in a management company, and a receipt processing system set up in a member company, wherein
   the business system comprises:
      a POS register which creates receipt data in accordance with a purchasing of a product at the store and has the product purchaser select a company to which the product purchaser belongs from a company list including a plurality of companies registered as members of the receipt management system;
      a biometric data reading unit which reads biometric data of the product purchaser; and
      an in-store management server which combines a company ID corresponding to the company selected by the product purchaser, the created receipt data, and the read biometric data as one datum, and transmits the one datum to the intermediation server as receipt data including biometric data, wherein
   the intermediation server searches a registered company management table having company IDs and IP addresses by using as a key the company ID contained in the receipt data including biometric data when the receipt data including biometric data is received from the business system, and determines that an IP address corresponding to a found company ID is a destination of the received receipt data including biometric data, and
   the intermediation server transfers the received receipt data including biometric data to the determined destination, and wherein
   the receipt processing system is set up in each of the plurality of companies, and
   the receipt processing system comprises:
      an in-company management server which searches an employee management table having employee IDs and biometric data by using as a key the biometric data contained in the receipt data including biometric data when the receipt data including biometric data is received from the intermediation server, and judges, in accordance with a result of the search, whether or not biometric data that coincides with the biometric data used as a key is registered in the employee management table.

2. A receipt management system including a business system set up in a store, an intermediation server set up in a management company, and a receipt processing system set up in a member company, wherein
   the business system comprises:
      a POS register which creates receipt data in accordance with a purchasing of a product at the store, which has a product purchaser select a company to which the product purchaser belongs from a company list including a plurality of companies registered as members of the receipt management system, and which has the product purchaser enter an employee ID of a company to which the product purchaser belongs;
      a biometric data reading unit which reads biometric data of the product purchaser; and
      an in-store management server which combines a company ID corresponding to the company selected by the product purchaser, the entered employee ID, the created receipt data, and the read biometric data as one datum, and transmits the one datum to the intermediation server as receipt data including biometric data, wherein the intermediation server searches a registered company management table including company IDs and IP addresses by using as a key the company ID contained in the receipt data including biometric data when the receipt data including biometric data is received from the business system, and for determining that an IP address corresponding to a found company ID is a destination of the received receipt data including biometric data, and the intermediation server transfers the received receipt data including biometric data to the determined destination, and wherein the receipt processing system is set up in each of the plurality of companies, and the receipt processing system comprises an in-company management server which searches an employee management table having employee IDs and biometric data by using as a key the employee ID contained in the receipt data including biometric data when the receipt data including biometric data is received from the intermediation server, and judges, in accordance with a result of the search, whether or not biometric data related to the employee ID used as a key is registered in the employee management table when an employee ID that coincides with the employee ID used as a key is searched for.

3. A receipt management system including a business system connected via a communication line to an external receipt system, the business system set up in a store, the receipt management system comprising:

the business system comprising:

a POS register which creates receipt data in accordance with a purchasing of a product at the store and has a product purchaser select a company to which the product purchaser belongs from a company list, the company list including a plurality of companies registered as members of the receipt management system;

a biometric data reading unit which reads biometric data of the product purchaser; and an in-store management server which combines a company ID corresponding to the company selected by the product purchaser, the created receipt data, and the read biometric data as one datum, and transmits the one datum to the external receipt system;

the external receipt system comprising:

a plurality of external receipt processing systems set up in each of the plurality of companies registered as members of the receipt management system; and an intermediation server which searches a registered company management table including company IDs by using as a key the company ID contained in the one datum wherein the one datum is received from the business system, and wherein the intermediation server determines a destination external receipt processing system associated with the received company ID where the datum is to be sent.

* * * * *